(12) United States Patent
Emmerich

(10) Patent No.: US 7,431,833 B1
(45) Date of Patent: Oct. 7, 2008

(54) FLOWABLE MATERIAL VESSEL

(76) Inventor: David D. Emmerich, 711 Moulder Loop Rd., Smiths Grove, KY (US) 42171

( * ) Notice: Subject to any disclaimer, the term of this patent is extended or adjusted under 35 U.S.C. 154(b) by 23 days.

(21) Appl. No.: 11/696,320

(22) Filed: Apr. 4, 2007

(51) Int. Cl.
*B01F 3/04* (2006.01)
*B01F 13/02* (2006.01)

(52) U.S. Cl. .................. 210/188; 210/218; 210/220; 366/101; 366/105; 261/124

(58) Field of Classification Search .............. 210/188, 210/218, 220; 366/101, 105; 261/124
See application file for complete search history.

(56) References Cited

U.S. PATENT DOCUMENTS

| | | | | |
|---|---|---|---|---|
| 2,212,841 | A | * | 8/1940 | Maxwell .................. 261/124 |
| 2,305,369 | A | | 12/1942 | Williams |
| 2,674,498 | A | * | 4/1954 | Thayer .................... 406/170 |
| 3,242,071 | A | | 3/1966 | Walker |
| 3,525,685 | A | | 8/1970 | Edwards |
| 4,100,023 | A | | 7/1978 | McDonald |
| 4,142,975 | A | | 3/1979 | Kinzer |
| 4,274,838 | A | | 6/1981 | Dale |
| 4,579,654 | A | | 4/1986 | Bremmer |
| 4,587,744 | A | * | 5/1986 | Huttlin .................... 34/588 |
| 4,696,746 | A | | 9/1987 | Ghosh |
| 4,697,356 | A | * | 10/1987 | Huttlin .................... 34/581 |
| 5,041,216 | A | | 8/1991 | Henzler |
| 5,288,170 | A | | 2/1994 | Cummings |
| 5,338,452 | A | | 8/1994 | Pidaparti |
| 5,409,610 | A | | 4/1995 | Clark |
| 5,942,116 | A | | 8/1999 | Clark |
| 6,257,751 | B1 | * | 7/2001 | Maltin .................... 366/101 |
| 6,299,774 | B1 | | 10/2001 | Ainsworth |
| 6,454,944 | B1 | | 9/2002 | Raven |
| 6,521,129 | B1 | | 2/2003 | Stamper |
| 6,569,332 | B2 | | 5/2003 | Ainsworth |
| 6,663,777 | B2 | | 12/2003 | Schimel |
| 6,719,897 | B1 | * | 4/2004 | Maltin .................... 210/151 |
| 6,733,671 | B1 | * | 5/2004 | Maltin .................... 210/321.6 |
| 6,848,375 | B2 | | 2/2005 | Kasin |
| 6,860,997 | B1 | | 3/2005 | Frederick |
| 6,908,555 | B2 | | 6/2005 | Arnett |
| 6,955,757 | B1 | | 10/2005 | Maltin |
| 2005/0077238 | A1 | | 4/2005 | Clark |

FOREIGN PATENT DOCUMENTS

GB 2305369 9/1997

* cited by examiner

*Primary Examiner*—Chester T. Barry
(74) *Attorney, Agent, or Firm*—John Salazar; Middleton Reutlinger

(57) ABSTRACT

A vessel is provided for treating flowable materials and methods of use wherein the vessel has a substantially cardioid cross-sectional configuration with a central cusp defining two upper rounded lobes. A front and rear wall enclose the ends of the sidewall with one having an inlet and the other having an outlet, both advantageously situated in different lobes forcing the materials to flow laterally within the vessel as well as longitudinally. A bubbler tube may be provided to longitudinally extend along a lower central portion of the sidewall aiding in the flow of materials within the vessel. Optionally, at least one gas outlet port is in an upper portion of at least one of the upper rounded lobes of the sidewall. Optionally, a flange depends from the sidewall cusp and longitudinally extends the sidewall. A bioremediation process is provided where a plurality of vessels are connected in series where the effluent from one vessel feeds the next vessel in series.

21 Claims, 3 Drawing Sheets

FLOWABLE MATERIAL VESSEL

BACKGROUND OF THE INVENTION

1. Field of the Invention

This invention relates in general to an apparatus and processes utilizing the apparatus, more particularly to a vessel for chemically or biologically treating flowable materials and processes therewith.

2. Description of the Related Art

It is common in various manufacturing and remediation processes to chemically react or biologically alter flowable materials such as liquids or sludges to form products for use, further processing, or disposal. These flowable materials may contain environmentally undesirable compounds, or pollutants. For example, many organic compounds are directly regulated by the Environmental Protection Agency (EPA) and/or adversely effect the chemical oxygen demand (COD) and/or biological oxygen demand (BOD) levels in rivers, streams, lakes, ponds, harbors, oceans and/or underground water reservoirs into which they enter. Many of such materials may not be permitted to be discharged directly into the environment making it advantageous to treat such materials onsite.

Often times the flowable materials to be reacted or treated contain a high amount of solids, for example manure. These sludges become difficult to mix and biologically treat or chemically react in traditional tanks or vessels. Traditional tanks or reactor vessels typically are in the shape of cylinders, or have a configuration with a larger volume in a lower portion of the vessel. Vessels of the prior art typically have a low flow rate in a lower portion of the vessel causing a higher amount of solids to settle or accumulate in the bottom of the vessel. The settling of solids in the tank, especially during system shutdown, makes it difficult or costly to restart or mix the entire contents of the vessel to eliminate dead spots or no-flow volumes within the vessel. The dead spots in the vessel result in slow or no treatment or reaction of the accumulating solids and reduce the usable volume of the vessel.

SUMMARY OF THE INVENTION

This application was funded with an award from the Kentucky Science and Technology Corporation under Contract # 146-403-134.

A vessel is provided for chemically reacting or biologically treating flowable materials. The flowable materials may have high solids content such as a thick sludge, for example manure. The vessel has a lower portion with a lower volume causing a higher flow rate or velocity of materials in a lower portion reducing no-flow spots within the vessel. The vessel comprises a longitudinally extending sidewall having a substantially cardioid cross-sectional configuration with a central cusp defining two upper rounded lobes. The term cardioid, as used herein, means an epicycloid generated by a point on a circle rolling around another circle. It is substantially heart shaped with a cusp depending from a top of the sidewall forming two upper rounded lobes. The cross-sectional configuration of the vessel may vary from a cardioid, but maintains the features of having a lower volume in a lower portion less than an upper volume in an upper portion and a cusp depending from a top of the side wall. A front and rear wall enclose the ends of the sidewall. Either the front or rear wall has an inlet and the other of the front or rear wall has an outlet. The inlet and outlet are advantageously situated in different lobes forcing the materials to flow laterally within the tank as well as longitudinally. Optionally, a bubbler tube longitudinally extends a lower central portion of the sidewall below the cusp aiding in the flow of materials within the vessel. The bubbler tube may be within a centrally oriented downwardly depending trough in the sidewall substantially surrounding a lower side of the bubbler tube. The bubbler tube may be fed with compressed air, effluent gas from the same or other vessel as is desired in anaerobic biological treatment, or any gas or gases that may aid in the biological degradation or chemical reaction of the materials within the vessel. Typically, the materials evolve gases upon degradation or reaction and are drawn from the tank through at least one gas outlet port in an upper portion of at least one of the upper rounded lobes of the sidewall. In one embodiment, both lobes have at least one gas outlet port maintaining equilibrium of pressure in the head space above the materials in each lobe. Optionally, a flange depends from the sidewall cusp toward the bubbler tube and longitudinally extends the sidewall. This flange bifurcates the flow of upwardly flowing materials at a lower portion of the vessel than the cusp alone.

The vessel may be used in any chemical or biological treatment system. In water and sludge treatment processes, bioreactors are often times employed to increase the rate of biodegradation of pollutants in a waste stream. An example of such a system is the biological processing of manure, a bioremediation process. A plurality of vessels may be connected in series where the effluent gas from one vessel feeds the bubbler tube of the next vessel in series, as is advantageous in an anaerobic process, and the effluent of manure feeds the influent of the next vessel in series. The main gas constituent evolved in the biological degradation of the manure is methane; hence this system configuration is advantageous for anaerobic microorganisms in breaking down the manure. Advantageously, the evolved methane is collected for use as an energy source or fuel. In aerobic treatment processes, air is introduced into the bubbler tubes of each vessel in series to feed the aerobic microorganisms. The liquid and solids effluent may have parameters allowing for use or sale as a liquid fertilizer. Aerobic or anaerobic microorganisms may be introduced into the system at several points to optimize biological activity. A first part of a series of vessels may operate aerobically while a later part of the series may be anaerobic. Alternatively, a first part of a series of vessels may operate anaerobically while a later part of the series may be aerobic. Additionally, other materials such as sawdust, porous materials, acids or bases for pH adjustment and nutrients may be introduced into the bioremediation system improving the bioreaction.

BRIEF DESCRIPTION OF THE DRAWING FIGURES

Reference to the figures discloses an embodiment of a flowable materials vessel and methods of use and is not to be interpreted as limiting the scope of the present invention as similar vessels and methods of use will become known by persons having ordinary skill in the art upon a reading of the present disclosure.

DETAILED DESCRIPTION OF THE PREFERRED EMBODIMENT(S)

The following description describes embodiments of a flowable material vessel and methods of use. In the following description, numerous specific details and options are set forth in order to provide a more thorough understanding of the present invention. It will be appreciated, however, by one skilled in the art that the invention may be practiced without such specific details or optional components and that such descriptions are merely for convenience and that such are selected solely for the purpose of illustrating the invention. As such, reference to the figures showing embodiments of the present invention is made to describe the invention and not to limit the scope of the disclosure and claims herein.

Figure 1:
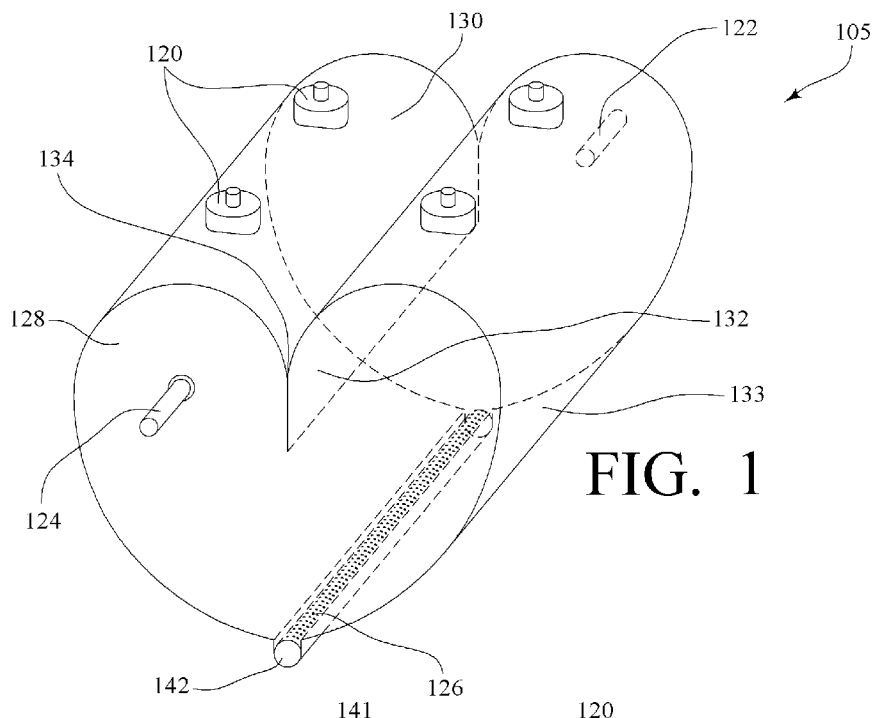
FIG. 1 is a perspective view of a flowable material vessel showing internal and external component parts thereof.

FIG. 1 shows vessel 105 for chemically reacting or biologically treating a flowable material therein. Vessel or tank 105 has longitudinally extending sidewall 133 having a substantially cardioid cross-sectional configuration with a central cusp 134 depending from an upper portion of sidewall 133 defining two upper rounded lobes. Vessel 105 may be comprised of one or more polymeric materials such as polypropylene, polyvinylchloride, or other plastic materials. Alternatively, vessel 105 may be comprised of stainless steel or other corrosive resistant materials. Sidewall 133 has a right side and a left side. The left side has a substantially curved shaped cross-sectional configuration forming an arc having a lower arc radius greater than an upper arc radius. The left side is a mirror image of said right side and joins the right side at each end of the arc forming sidewall 133 having a top, bottom and sides of vessel 105. The top of vessel 105 depends inwardly, most prominently at cusp 134. Front wall 128 encloses a front of sidewall 133 and has a substantially cardioid configuration with two upper rounded lobes. Rear wall 130 encloses a rear of sidewall 133 and also has a substantially cardioid configuration with two upper rounded lobes. Front wall 128 has an inlet or outlet 124 substantially centrally oriented within the left upper lobe and rear wall 130 has the other of an inlet or outlet 122 substantially centrally oriented within the right lobe. Optional bubbler tube 126 longitudinally extends along a lower central portion of sidewall tube 126 having a gas inlet 142. A plurality of optional gas outlet ports 120 are shown in an upper portion of both upper rounded lobes of sidewall 133. Optional flange 132 depends from sidewall cusp 134 and longitudinally extends sidewall 133 substantially bifurcating an internal upper portion of vessel 105. Advantageously, flange 132 extends the length of sidewall 133 and joins front wall 128 and rear wall 130 and depends from cusp 134 about halfway to bubbler tube 126. In an embodiment having bubbler tube 126, vessel 105 may have sidewall 133 with a centrally oriented downwardly depending trough 141 substantially surrounding a lower side of bubbler tube 126.

Figure 2:
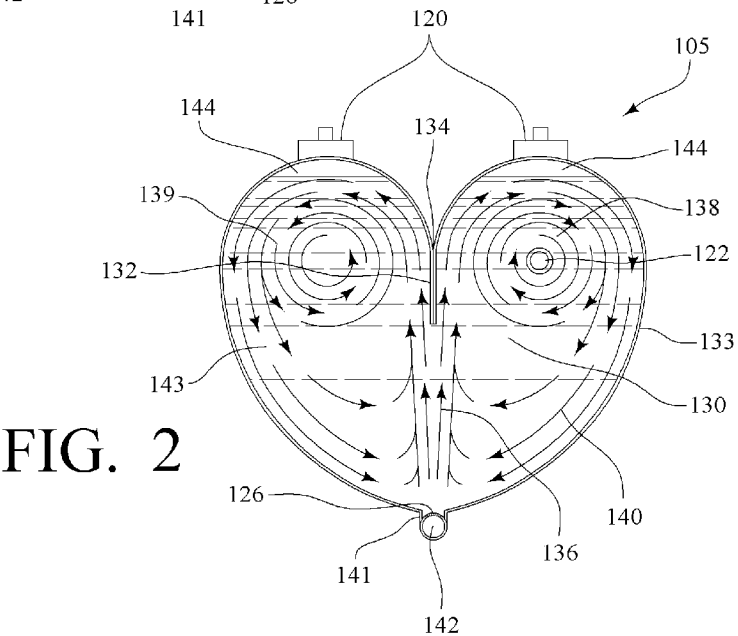
FIG. 2 is cross-sectional view of the vessel of FIG. 1 showing a flow pattern of materials therein.

FIG. 2 is a cross-sectional view of vessel 105 showing a flow diagram of materials being processed therein. A sludge or other flowable material is fed into inlet 124 (shown in FIG. 1) and rotates within vortex 139 for a length of sidewall 133. As the material migrates toward rear wall 130, the materials migrate toward the outer portion of vortex 139 until they reach downward flow 143. Bubbler tube 126 has perforations therein and is maintained under pressure with a gas. The gas is longitudinally injected into the vessel 105 forcing an upward flow of materials 136. The gas injected may be any gas, but is advantageously methane generated in another tank 105 for anaerobic biodigestion or air for aerobic biodigestion. The materials then rise in upward flow 136 where it is bifurcated with cusp 134 or optional flange 132. As the material circulates about the left half of tank 105 and longitudinally toward rear wall 130, it migrates toward sidewall 133 until it reaches a central portion of upward flow 136. The material eventually flows upward toward the right lobe and about vortex 138 where it reaches downward flow 140. As the material longitudinally continues migrating toward rear wall 130, it eventually enters vortex 138 and flows out outlet 122. This flow pattern is shown and described only for illustrating a advantageous flow pattern within vessel 105 as variations to the flow will most probably be exhibited during use. For example, if the material is liquid in nature and the bubbler tube 126 flow rate is high, the materials may flow a plurality of times through each lobe during the longitudinal migration of sidewall 133. An important feature of the substantial cardioid configuration of vessel 105 is the lower volume of the lower portion of tank 105 proximate bubbler tube 126. This configuration causes the flow rate of materials in the lower portion of vessel 105 to be higher than the flow rate of materials in an upper portion. The higher velocity of materials improves mixing and suspending of solids within vessel 105 and substantially decreases the accumulation of sediment and the formation of no-flow volumes. Also, during a shutdown of the process the solids tend to settle within the tank proximate bubbler tube 126. When the system is restarted, the solids are brought back into suspension with the upward flow 136 within vessel 105. It is important to note that the materials fed into tank 105 may be sludge with a high solids content, such as manure, and the residents time therein may be minutes, hours, days, weeks, or even months. Therefore the longitudinal flow rate may be quite slow and the gas pressure feeding bubbler tube 126 may be increased to an extent necessary to minimize or eliminate the formation of no flow volumes within tank 105. In an advantageous embodiment of tank 105, sidewall 133 has a width of approximately three meters with a flow rate of materials into inlet 124 of about one hundred gallons per hour wherein the materials have about 14% solids. Also shown in FIG. 2 are gas ports 120 centrally oriented in each lobe of sidewall 133 for drawing off produced Bases such as methane produced during the biodigestion of manure and accumulated in head space 144.

Figure 3:
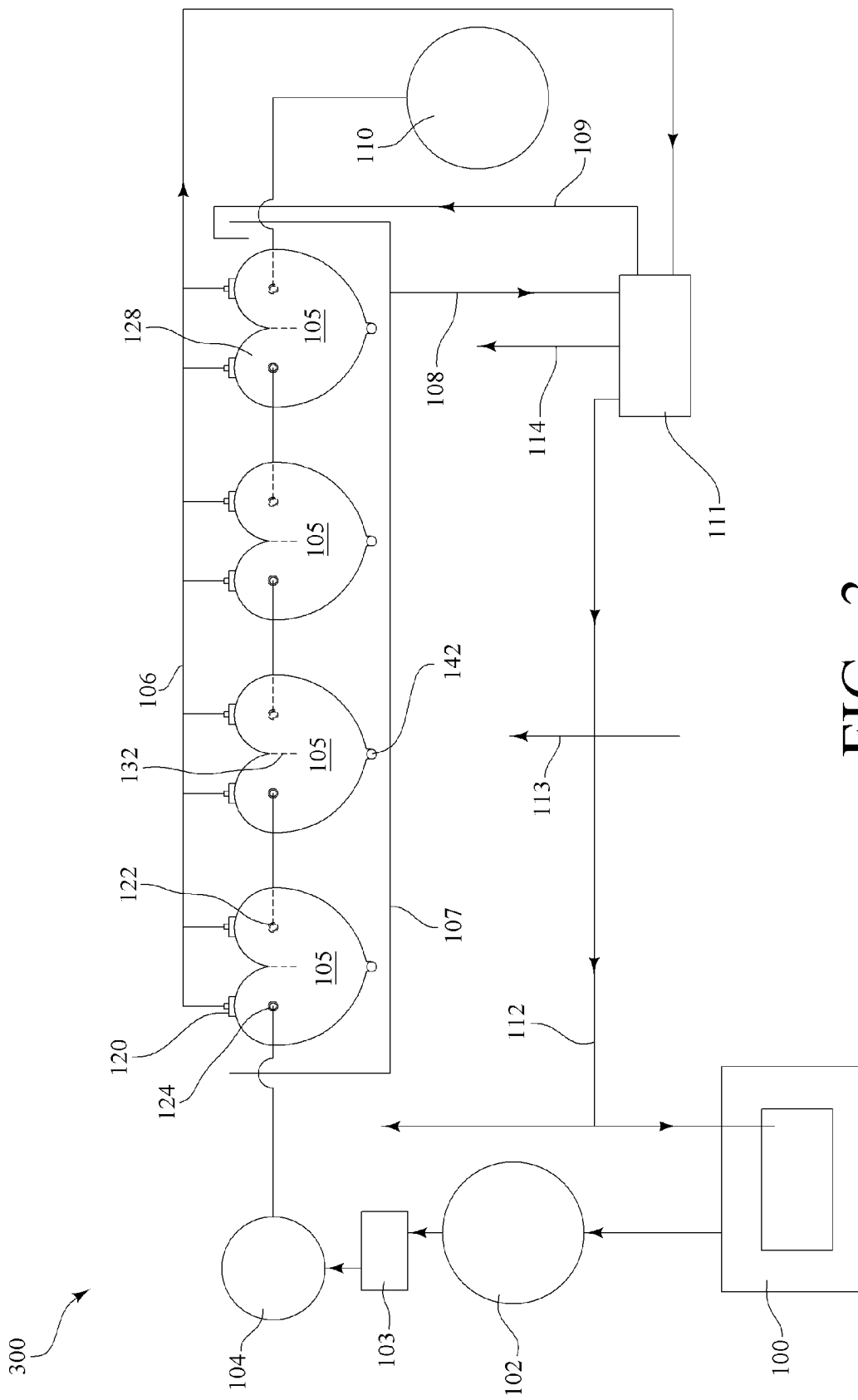
FIG. 3 is a schematic view of an embodiment of a process for aerobic treatment of flowable materials in a series of vessels shown in FIG. 1.

FIG. 3 shows an example of a process having a plurality of tanks 105 connected in series for the aerobic biodigestion of manure. Aerobic process 300 has storage area 100, which may be in the form of a feedlot pad or barn, used to store feedstock, in this example manure. The manure is then fed to temporary storage lagoon 102 and on to solid waste separator 103 where a portion of the solids are separated from the liquids. Materials are then fed from solid waste separator 103 to mixing tank 104. An amount of liquids or solids may be added to mixing tank 104 where the materials are mixed producing a flowable material. Microorganisms or other biodigestion enhancing substances such as sawdust may be added at mixing tank 104. The mixed flowable materials are then pumped into inlet 124 of the first tank 105 in the series of tanks 105. Gas such as air is pumped into bubbler tube gas inlet 142 inducing an upward flow of materials within a central portion of tank 105. The solids and liquids migrate toward outlet 122 and the gases evolved during biodigestion are collected at gas outlet ports 120. The liquids and solids flowing from outlet port 122 of a first vessel 105 are fed into an inlet 124 of a second vessel 105. An upward flow of materials are induced in each vessel 105 via pumping gas into each bubbler tube gas inlet 142. The liquids and solids exiting each tank 105 at outlet 122 are fed to the next tank 105 via inlet 124 until the last tank 105 in series is reached. The number of tanks 105 in series is dependent upon several factors such as desired residence time within tanks 105, the flow rate of materials therethrough, ambient air temperature, activity of the microorganisms, and other factors which may or may not be controllable. The effluent sludge material from the last tank 105 in series is collected at fertilizer collection station 110 where it is advantageously sold as a liquid fertilizer and transported from the site. The effluent gas from each tank is collected from gas outlet ports 120 and transported through pipe 106 to gas reclamation station 111. Gas reclamation station 111 may perform several functions such as gas scrubbing, power generation, and heat generation. The scrubber in gas reclamation station 111 may be designed to remove $H_2S$, $CO_2$, and/or other constituents and may incorporate a flame check system. A microturbine may be used to produce power 113 for sale or power 112 for onsite use. The microturbine exhaust 114 may be used to heat buildings. Furthermore, a temperature control lagoon 107 may have a bath of heat exchanger fluid, such as water, therein surrounding vessels 105. Temperature control of tanks 105 used in a biodigestion process may be critical, especially during winter, since the activity of the microorganisms is typically temperature dependent and freezing of the materials within the system can damage the system. It has been found that a temperature in excess of 100° F. provides an improved environment for growth of microorganisms within tanks 105. A temperature of about 105° F. has been found to be most suitable for many microorganisms. The water in lagoon 107 may be heated with cooling water from a microturbine, where the microturbine draws water from lagoon 107 through pipe 108 and returns warm water through pipe 109. Alternatively, the heat exchanger fluid in lagoon 107 may be cooled as bioreactions are exothermic and in combination with solar energy may increase the temperature in vessels 105 above a desired temperature range. In an advantageous embodiment, the flowable materials fed from mixing tank 104 into a first tank inlet 124 has in the range of about 10% to 20% solids and more advantageously about 14% solids.

Figure 4:
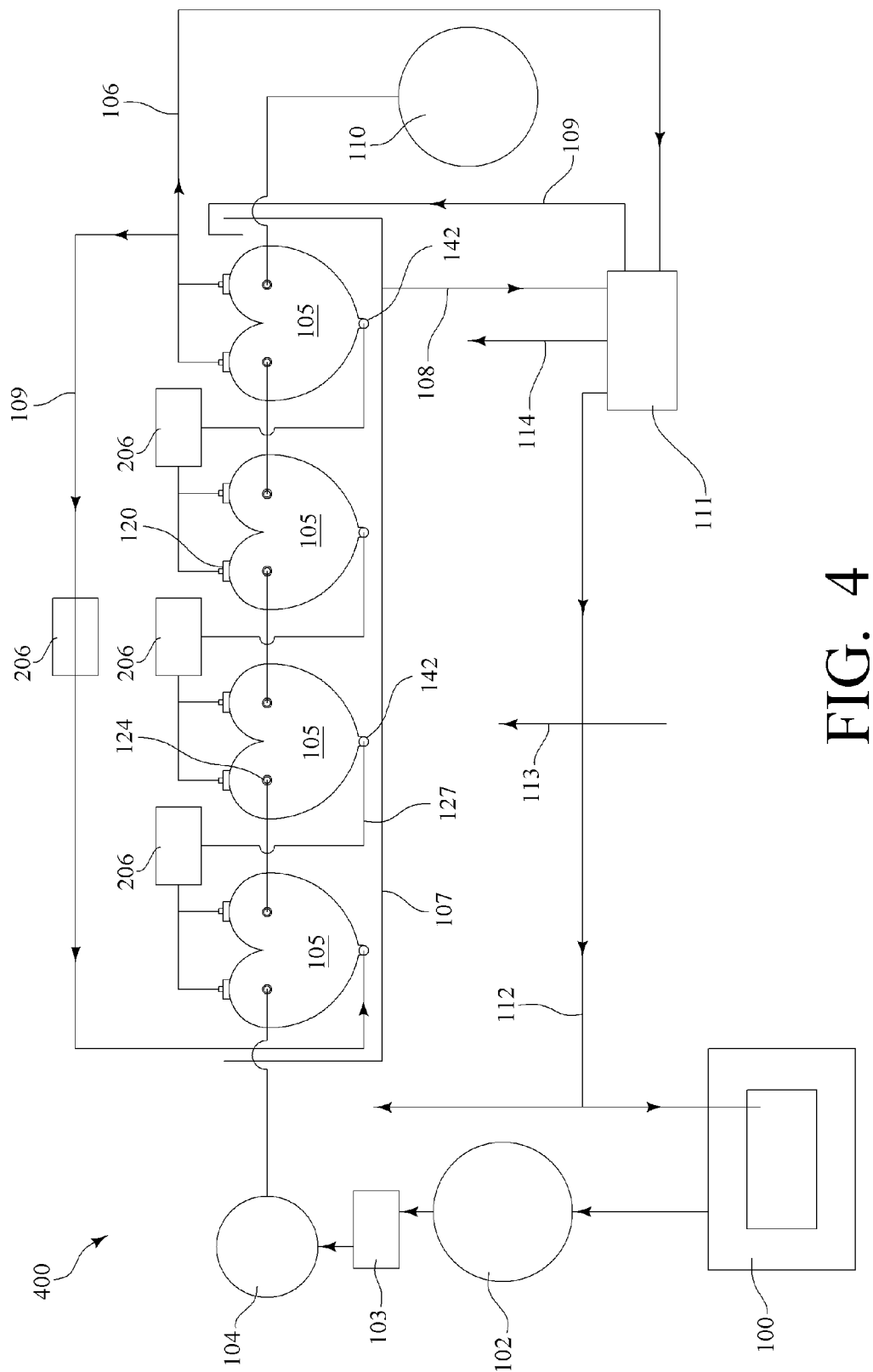
FIG. 4 is a schematic view of an alternative embodiment of a process for anaerobically treating flowable materials in a series of vessels shown in FIG. 1.

FIG. 4 shows an example of a process having a plurality of tanks 105 connected in series for the anaerobic biodigestion of manure. Anaerobic process 400 has storage area 100 used to store feedstock, in this example manure. The manure is then fed to temporary storage lagoon 102 and on to solid waste separator 103 where the dissolved oxygen level is sufficiently reduced to support anaerobes and a portion of the solids are separated from the liquids. Materials are then fed from solid waste separator 103 to mixing tank 104. An amount of liquids or solids may be added to mixing tank 104 where the materials are mixed producing a flowable material. Microorganisms or other biodigestion enhancing substances may be added at mixing tank 104. The mixed flowable materials are then pumped into inlet 124 of the first tank 105 in the series of tanks 105. Evolved gases, primarily methane, from the first tank 105 in series is transported via gas pipe 127 from gas outlet port 120 to bubbler tube inlet 142 in the second tank 105 in series. The third tank 105 bubbler tube inlet 142 receives gas via pipe 127 generated within the second tank 105 and so on until the gas generated in the last tank 105 in series is transported via transfer pipe 109 to bubbler tube inlet 142 in the first tank 105 in series. This recycling of gases from one tank 105 into another tank 105 creates a closed system substantially reducing or even eliminating the introduction of oxygen into system 400 providing an enhanced environment for the anaerobic microorganisms to digest the manure. Optionally, a scrubber 206 is placed inline of one or more or even each gas pipe 127 and 109 scrubbing the recycled gases prior to introduction into a tank 105 to reduce constituents that may be adverse to the growth of the anaerobic microorganisms. Scrubbers 206 may be design to remove $H_2S$, $CO_2$, and/or other constituents and may incorporate a flame check system. The recycled gases injected into bubbler tube gas inlets 142 induce an upward flow of materials within a central portion of tank 105.

A portion of the effluent gas from the final tank 105 in series is collected from gas outlet ports 120 and transported through pipe 106 to gas reclamation station 111. Gas reclamation station 111 may perform several functions such as gas scrubbing, power generation, and heat generation. For example, a microturbine may be used to produce power 113 for sale or power 112 for onsite use. The microturbine exhaust 114 may be used to heat buildings. It has been found that a temperature in excess of 100° F. provides an improved environment for growth of microorganisms within tanks 105. A temperature of about 105° F. has been found to be most suitable for selected microorganisms. However, it is anticipated that other temperatures will provide adequate growth environments for other microorganisms. The water in optional temperature control lagoon 107 may be heated with cooling water from a microturbine, where the microturbine draws water from lagoon 107 through pipe 108 and returns warm water through pipe 109. The solids and liquids migrate toward outlet 122. The liquids and solids flowing from outlet port 122 of a first vessel 105 are fed into an inlet 124 of a second vessel 105. An upward flow of materials are induced in each vessel 105 via pumping recycled gas into each bubbler tube gas inlet 142. The liquids and solids exiting each tank 105 at outlet 122 are fed to the next tank 105 via inlet 124 until the last tank 105 in series is reached. The effluent sludge material from the last tank 105 in series is collected at fertilizer collection station 10 where it is advantageously sold as liquid fertilizer, typically low in odor, and transported from the site.

The aerobic process of FIG. 3 can be combined with the anaerobic process of FIG. 4 wherein a dissolved oxygen level is sufficiently reduced to support anaerobes in temporary storage lagoon 102 and/or solid waste separator 103. A first set of tanks 105 in series have evolved gases, primarily methane, from the tanks 105 in series transported via gas pipe 127 from gas outlet ports 120 to bubbler tube inlets 142 therein. A second set of vessels 105 in the same series have air introduced into bubbler tube inlet 142 to produce dissolved oxygen levels sufficient to support aerobes therein. The different sets of vessels 105 in series may be in separate temperature control baths 207, have different microbes introduced therein, have different volumes resulting in different residence times, and/or have different nutrients or other additives introduced therein to provide more optimum environments for the anaerobes and aerobes. The number of vessels in each set of vessels 105 in series and the size of each vessel will depend on a variety of factors such as the microbes used, ambient temperature, pH of any water added in mixing tank 104, volume of material to be treated, etc. Such an anaerobic and aerobic treatment configuration is desirable in producing a biodigested product having a low COD and/or BOD.

While the present invention has been shown and described herein in what are considered to be the preferred embodiments thereof, illustrating the results and advantages over the prior art obtained through the present invention, the invention is not limited to those specific embodiments. Thus, the forms of the invention shown and described herein are to be taken as illustrative only and other embodiments may be selected without departing from the scope of the present invention, as set forth in the claims appended hereto.

I claim:

1. A vessel for chemically reacting or biologically treating a flowable material comprising:

a longitudinally extending sidewall having a substantially cardioid cross-sectional configuration with a central cusp defining two upper rounded lobes;

a front wall enclosing a front of said sidewall;

a rear wall enclosing a rear of said sidewall;

said front wall having an inlet or outlet substantially centrally oriented within one of said upper lobes; and said rear wall having the other of said inlet or outlet substantially centrally oriented within the other of said upper lobes.

2. The vessel of claim 1 wherein said front and rear walls have a substantially cardioid configuration with two upper rounded lobes.

3. The vessel of claim 1 having a bubbler tube longitudinally extending along a lower central portion of said sidewall.

4. The vessel of claim 1 having at least one gas outlet in an upper portion of at least one of said upper rounded lobes of said sidewall.

5. The vessel of claim 1 having at least one gas outlet in an upper portion of each of said upper rounded lobes of said sidewall.

6. The vessel of claim 1 having a flange depending from said sidewall cusp and longitudinally extending said sidewall.

7. The vessel of claim 6 wherein said flange extending said sidewall joins said front wall and said rear wall.

8. The vessel of claim 3 wherein said sidewall has a centrally oriented downwardly depending trough substantially surrounding a lower side of said bubbler tube.

9. A longitudinally extending cardioid shaped vessel having a sidewall with two upper lobes with a cusp therebetween, a cardioid shaped front wall enclosing a first end of said sidewall, and a cardioid shaped rear wall enclosing a second end of said sidewall.

10. The vessel of claim 9 wherein said front wall has either an inlet or an outlet and said rear wall has the other of said inlet or said outlet.

11. The vessel of claim 10 wherein said inlet and said outlet are substantially symmetrically oriented within one of said lobes of said front wall and said rear wall.

12. The vessel of claim 11 wherein said inlet and said outlet are oriented within different lobes within said front wall and said rear wall.

13. The vessel of claim 9 having a flange inwardly depending from said cusp substantially bifurcating an internal upper portion of said vessel.

14. The vessel of claim 9 having at least one gas outlet port in each of said lobes.

15. The vessel of claim 14 wherein said gas outlet ports are in said sidewall.

16. The vessel of claim 9 having a bubbler tube in a lower portion thereof substantially extending along said sidewall.

17. A vessel comprising a longitudinally extending sidewall having a right side and a left side, said left side having a substantially curved shaped cross-sectional configuration forming an arc having a lower arc radius greater than an upper arc radius, said left side is a mirror image of said right side and joins said right side at each end of said arc forming a top and bottom of said vessel, said top of said vessel depends inward, said longitudinally extending sidewall has a front and rear wall enclosing said vessel.

18. The vessel of claim 17 wherein said bottom of said vessel has a bubbler tube proximate an inner surface and substantially extending the length of said sidewall.

19. The vessel of claim 17 wherein said top of said vessel has an inwardly depending flange substantially extending the length of said sidewall.

20. The vessel of claim 17 wherein said front wall has an inlet in an upper portion of either the right or left side of said vessel and said rear wall has an outlet in an upper portion of the other of said right or left side of said vessel.

21. The vessel of claim 17 wherein said left and right sides of said sidewall have at least one gas outlet port in an upper portion thereof

* * * * *